United States Patent [19]

Schrörs

[11] Patent Number: 4,984,343
[45] Date of Patent: Jan. 15, 1991

[54] HYDROSTATICALLY SUPPORTED ROLL AND A SEALING ELEMENT THEREFOR

[76] Inventor: Günter Schrörs, Corneliusstrasse 29, D-4154 Tönisvorst 1, Fed. Rep. of Germany

[21] Appl. No.: 370,348

[22] Filed: Jun. 22, 1989

[30] Foreign Application Priority Data

Jun. 22, 1988 [DE] Fed. Rep. of Germany ....... 3820974

[51] Int. Cl.$^5$ .............................................. B21B 13/02
[52] U.S. Cl. ..................................... 29/116.2; 29/113.2
[58] Field of Search ................. 29/113.1, 113.2, 116.1, 29/116.2

[56] References Cited

U.S. PATENT DOCUMENTS

| | | | |
|---|---|---|---|
| 3,803,044 | 4/1974 | Spillmann et al. | 29/113 |
| 4,186,472 | 2/1980 | Biondetti | 29/116.2 X |
| 4,319,390 | 3/1982 | Wolf | 29/116 |
| 4,726,691 | 2/1988 | Lehmann | 384/99 |
| 4,751,775 | 6/1988 | Kubik | 29/116.2 |
| 4,815,183 | 3/1989 | Bondetti | 29/116.2 |
| 4,856,157 | 8/1989 | Kusters | 29/113.2 X |

FOREIGN PATENT DOCUMENTS

| | | |
|---|---|---|
| 0252251 | 2/1988 | European Pat. Off. |
| 2230139 | 1/1980 | Fed. Rep. of Germany |
| 2907761 | 9/1980 | Fed. Rep. of Germany |
| 3640902 | 6/1988 | Fed. Rep. of Germany |
| 3640903 | 6/1988 | Fed. Rep. of Germany |

Primary Examiner—Timothy V. Eley
Assistant Examiner—Frances Chin
Attorney, Agent, or Firm—Kenyon & Kenyon

[57] ABSTRACT

A sealing element for a hydrostatically supported roll having bending control is disclosed in which a row of sealing elements is provided in a stationary crosshead for supporting a rotatable hollow cylinder arranged around the crosshead. Each of the sealing elements has a contact surface, including an enclosed circular rim, for abutting the inner circumference of the hollow cylinder. First ducts having a large cross sectional area are connected with a fluid supply line for supplying hydraulic fluid to a hydrostatic pressure chamber formed inside the rim. A cylinder volume is formed in the sealing element between the end of a longitudinal bore in the sealing element and a piston, which includes a central passageway connected with a second, separate fluid supply line. The piston is fixedly mounted to the crosshead and arranged in the cylinder volume. The cylinder volume is connected via second restricted ducts with respective rim chambers, which may be formed in the enclosed rim or radially outside same, for throttling fluid supplied to the rim chambers. The hydraulic fluid in the rim chambers forms a liquid film on the inner circumference on the hollow cylinder over which the sealing element uniformly abuts the inner circumference.

26 Claims, 4 Drawing Sheets

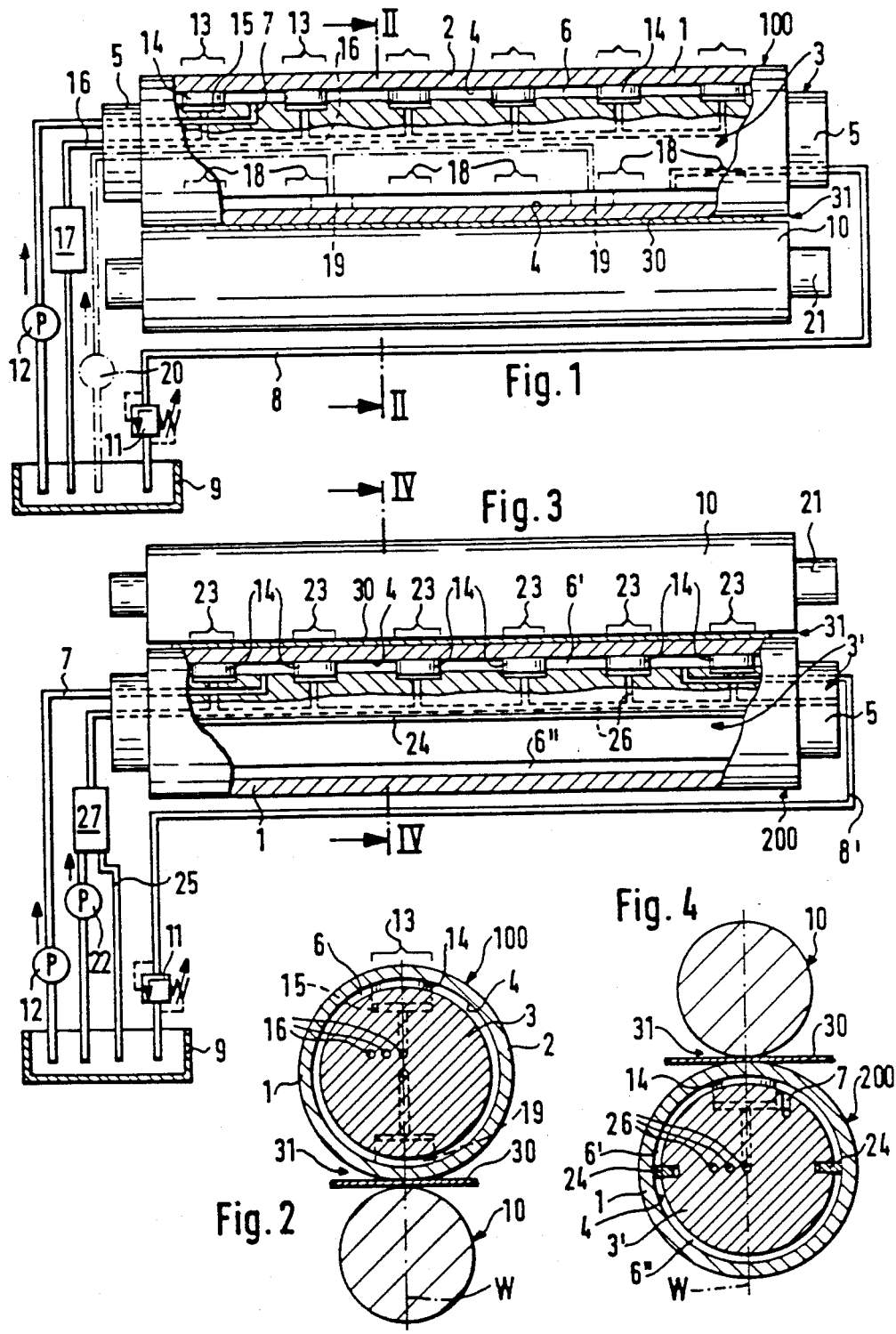

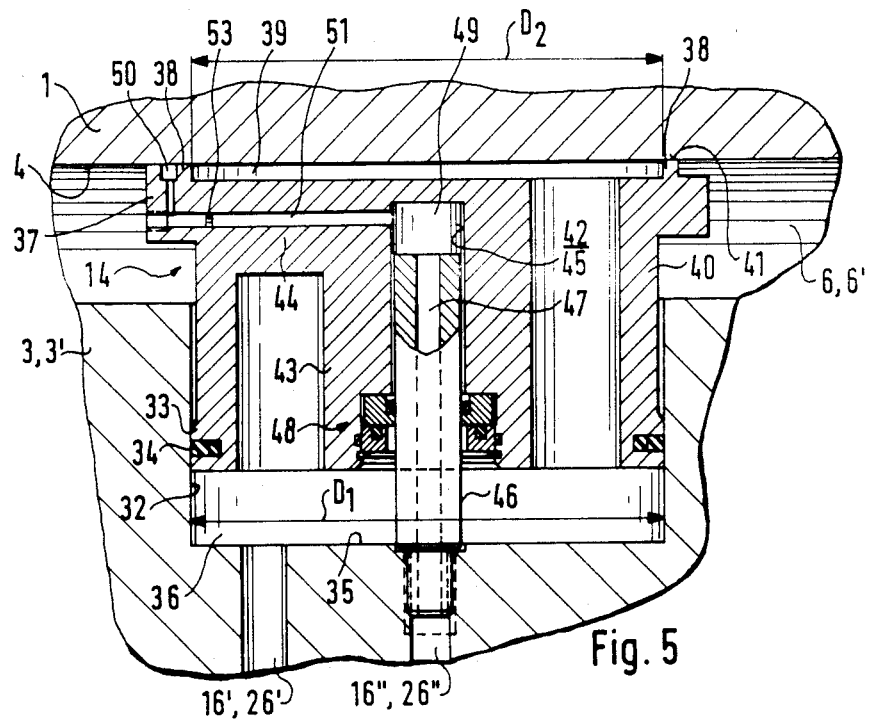
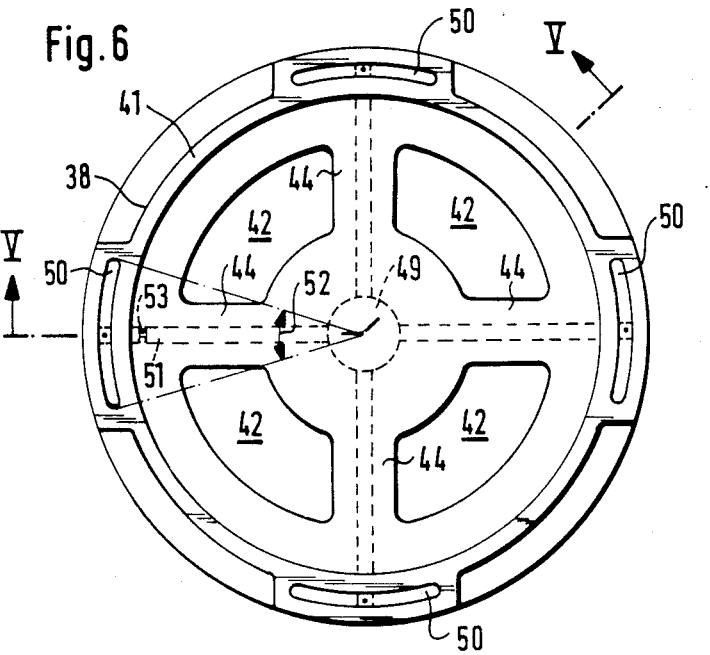

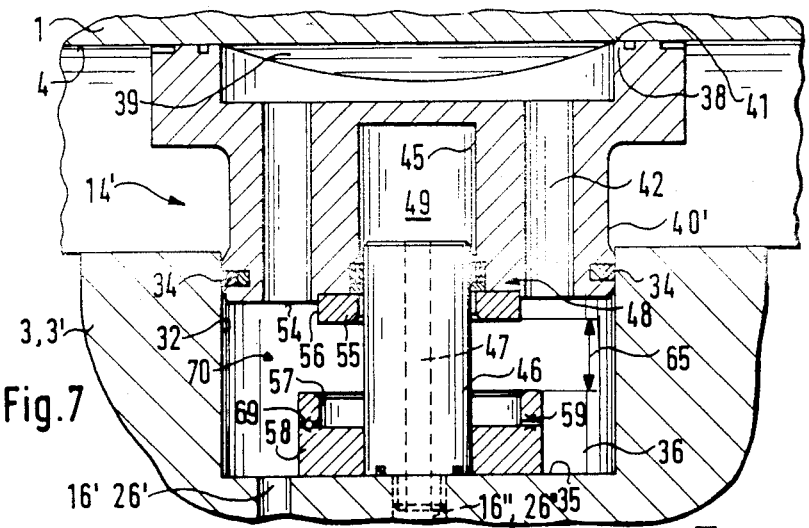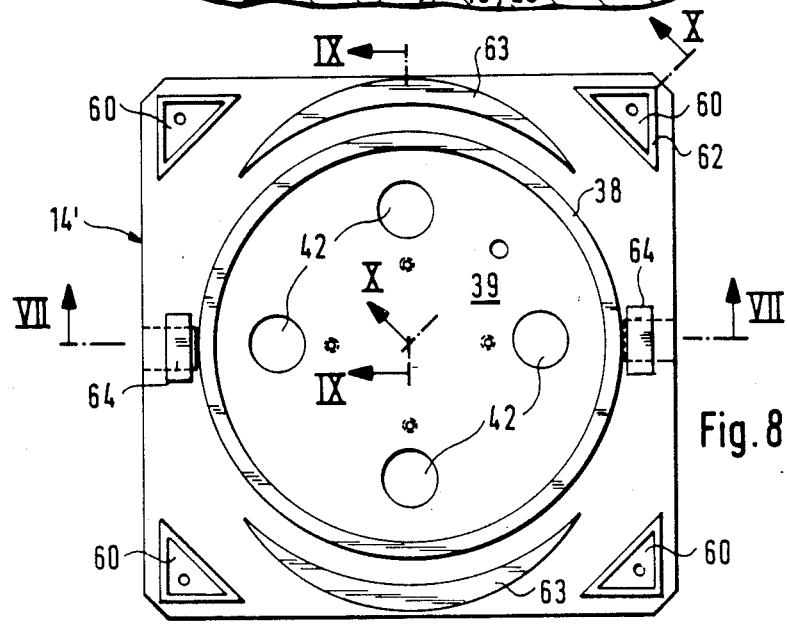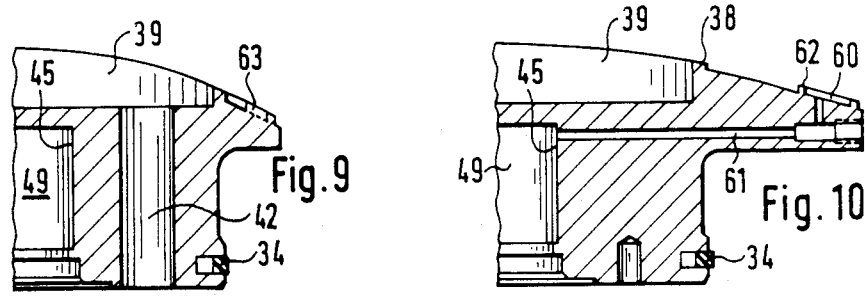

1

HYDROSTATICALLY SUPPORTED ROLL AND A SEALING ELEMENT THEREFOR

BACKGROUND OF THE INVENTION

The invention relates generally to hydrostatically supported rolls and, more particularly, to an improved sealing element for such a roll.

A roll having piston-like sealing elements of this type is disclosed in DE-OS 3640903, which is a foreign counterpart to the assignee's allowed U.S. application Ser. No. 07/126,773, filed Nov. 30, 1987, now U.S. Pat. No. 4,856,157, entitled Roll With Controllable Line Pressure. Sealing elements of this type can function both as "overpressure" and "underpressure" elements. What this means is that the clearance space between the crosshead and the inner circumference of the hollow cylinder of the roll, outside of the sealing elements can either be empty or filled with hydraulic fluid at a predetermined pressure. When the force exerted against the inner circumference of the hollow cylinder by the hydraulic fluid in the pressure chamber of a sealing element is greater than the force that would have been exerted against the corresponding sectional area of the inner circumference of the hollow cylinder if no sealing element were present, the sealing element functions as an "overpressure" element. Therefore, a pressure that is greater than the pressure existing in the clearance space is exerted locally, by the effective sectional area of the sealing element, against the inner circumference of the hollow cylinder, and the sealing element functions in the same way as the supporting elements disclosed in DE-AS 2230139. When the sealing element functions as an "underpressure" element, the clearance space between the crosshead and the inner circumference of the hollow cylinder outside of the sealing element is filled with hydraulic fluid at a predetermined pressure and the pressure in the area of the sealing element is lower than the ambient pressure in the clearance space. In this manner, the sealing element causes a reduced pressure zone or a "hole" to be formed in the surrounding volume of hydraulic fluid in the clearance space. Thus, either low pressure or no pressure at all prevails in this zone or "hole" when the sealing element functions as an "underpressure" element. Such a sealing element function is described in DE-OS 3640902, which also is a counterpart foreign application to allowed U.S application Ser. No 07/126,773 discussed above.

When the sealing elements are to operate as "overpressure" elements in accordance with DE-AS 2230139 and accordingly, a high pressure prevails in the pressure chamber, the pressure chambers of the sealing elements, including the choke bores, must be sealed such that the required contact pressure can develop at the inner circumference of the hollow cylinder. However, when the sealing elements are to operate as low pressure elements, the hydraulic fluid entering into the pressure chamber must be able to flow out unhindered, i.e., without a significant pressure build up. Thus, the resistance to flow of the sealing element must be different in each of the two flow directions. For this purpose, nonreturn or check valves, which are closed in the direction of flow into the pressure chambers and open in the reverse direction, are mounted in the sealing elements of the DE-AS 3640902. As discussed above, the fundamental design of the sealing elements in high pressure mode of operation corresponds generally to that of the supporting elements of DE-AS 2230139.

Use of these nonreturn valves entails a certain expense, which makes the sealing elements more expensive. Moreover, their functioning can be adversely affected by impurities, which are carried in the hydraulic fluid and settle onto the valve seat. In addition, when a known sealing element functions as an "overpressure" element and one or more of its choke bores, which lead to one or more pressure chambers adjacent the inner circumference of the cylinder, becomes clogged, a sufficient amount of hydraulic fluid no longer can flow into its respective pressure chamber and then over its rim. This condition endangers the formation of a load-bearing liquid film between the sealing element and hollow cylinder. The resulting metallic friction and corrosion, which can appear on the inner circumference of the hollow cylinder, may cause the respective sealing element to breakdown and, in an extreme case, can even prevent rotation of the roll.

SUMMARY OF THE INVENTION

The invention is directed to the problem of providing a simpler and more reliable construction of a sealing element for rolls of the type discussed above.

The invention solves this problem by providing a roll having controllable line pressure comprising a rotatable hollow cylinder forming a working roll circumference at its outer diameter, a stationary crosshead extending lengthwise through the hollow cylinder to form a surrounding clearance space with an inner circumference of the hollow cylinder, and piston-like sealing elements distributed over the length of the hollow cylinder radially movable in cylinder bores provided in the crosshead, which form respective cylinder chambers between the bottom end of each sealing element and bottom surface of its cylinder bore. Each sealing element has a piston and cylinder unit for moving the sealing element in its respective cylinder bore. The unit is disposed parallel to the longitudinal axis of the respective cylinder bore and has a cylinder volume of considerably smaller cross sectional area than that of its respective cylinder bore. The piston is disposed in the cylinder volume and one of the piston and cylinder volume is provided on the bottom surface of the respective cylinder pocket bore, while the other of the piston and cylinder volume is formed on the respective sealing element. At least two separate hydraulic fluid supply lines are provided in the crosshead, with a first one of the supply lines being connected to the cylinder chambers beneath the sealing elements and a second one of the supply lines being connected to the cylinder volumes of the piston and cylinder units. Each sealing element includes a contact surface having a shape conforming to the inner circumference of the hollow cylinder for sealingly abutting same. The contact surface is formed by an enclosed rim defining a hydrostatic pressure chamber therein, which has an open end facing toward the inner circumference of the hollow cylinder. At least two rim chambers separate, and spaced, from the hydrostatic pressure chamber are provided, with the rim chambers also having an open end facing the inner circumference of the hollow cylinder. At least one unrestricted first duct, extending through the sealing element is connected between the cylinder chamber and the pressure chamber for supplying hydraulic fluid thereto without a drop in pressure. At least two restricted second ducts, each of which is separate from the first duct and connected between its cylinder volume and a respective rim chamber for throttling the flow of hydraulic fluid supplied thereto. The invention is also directed to the improved sealing elements, per se.

One important distinction between the sealing element of the invention and those of the prior art lies in the cylinder chamber, i.e., the space formed between the bottom surface of the cylinder bore and the bottom of the sealing element, which is no longer connected with the pressure chamber by way of choke bores as in the prior art, but rather is connected by at least a first unrestricted duct having a relatively large cross section. Flow through the first duct does not cause any significant pressure drop to occur between the cylinder chamber and pressure chamber. Thus, the sealing element of the invention does not function according to the principles of operation of the type of sealing element disclosed in DE-AS 2230139, but rather functions more in accordance with the principles of operation of the type of sealing element disclosed in DE-OS 2907761. However, in contrast to the sealing element of DE-OS 2907761, the invention provides additional, separately supplied rim chambers, each of which are individually fed with partially throttled fluid from the cylinder volume. Each rim chamber, itself, acts as a supporting element in accordance with those disclosed in DE-AS 2230139.

A further advantage of the invention obviates of use of nonreturn valves in the sealing element. The pressure of the fluid in the pressure chamber is always the same as that of the fluid in the cylinder chamber because the contact force is not generated by the hydraulic fluid that subsequently overflows into the pressure chamber, as is the case with known sealing elements, but rather is generated separately by the pressure of the fluid in the cylinder volume of the piston and cylinder unit. This pressure can be controlled, and, therefore, the sealing element can be pressed with varying pressure against the inner circumference of the hollow cylinder. The hydraulic fluid flows out of the cylinder volume via a throttling duct into a respective rim chamber (which, itself, acts like the supporting element of DE-AS 2230139 as discussed above) and flows over its rim in a controlled manner. Thus, a supporting, load-bearing film of a specific thickness is formed on the contact surface of the rim.

An important stabilizing function of the invention is carried out by the arrangement of at least two rim chambers spaced at a distance from the center of the pressure chamber. The rim chambers keep the rim of the pressure chamber at a uniformly small distance from the inner circumference of the hollow cylinder and prevent any metallic contact between the rim and the inner circumference of the hollow cylinder. In principle, although the benefits of the invention are accomplished with provision of just two rim chambers that lie opposite each other relative to the pressure chamber, it is preferred to provide at least three rim chambers, which are evenly distributed over the circumference of the sealing element. Each rim chamber is supplied separately from the cylinder volume via a respective throttling duct. As a result, the rim chambers may be distributed evenly over the circumference to provide a three-point or multi-point bearing arrangement for the sealing elements. The rim chambers may be formed in the enclosed rim surrounding the pressure chamber by forming recesses in the rim. These recesses are connected with the cylinder chamber via the throttling ducts.

Alternatively, the rim chambers may be arranged separately from the enclosed rim that defines the pressure chamber. In particular, they may be disposed radially outward of the enclosed rim. The stabilizing function can be achieved as long as the rim chambers are formed outside of the pressure chamber at a sufficient distance from its center.

The effective cross sectional areas of the pressure chamber and the cylinder bore may be the same. With this design, the sealing element is unaffected by the forces in the cylinder chamber and pressure chamber, and the contact pressure is determined solely by the pressure in the cylinder volume. Alternatively, the effective cross sectional area of the pressure chamber may be somewhat larger, for example 5% (percent) larger than that of the cylinder bore. As a result of the pressure in the pressure chamber and its somewhat larger area, a net force develops that tends to force the sealing element away from the inner circumference of the hollow cylinder. If a constant quantity or flow of hydraulic fluid is supplied to the cylinder chamber the pressure of the fluid in the pressure chamber will drop when the sealing element is moved away from the inner circumference of the hollow cylinder. Movement of the sealing element in this manner acts against the pressure in the cylinder volume. An equilibrium is produced thereby, which is determined by the pressure in the cylinder volume. In this embodiment, the sealing element functions more or less in the same manner as a servo controlled pressure relief valve.

This specific embodiment is especially advantageous for rolls that are temperature-controlled, i.e. heated or cooled by the flow of hydraulic fluid supplied to the pressure chamber. A constant volume of hydraulic fluid having a predetermined temperature can be supplied to the sealing element for transferring the heat of the fluid to the inner circumference of the hollow cylinder. The amount of heat transmitted per unit of time is constant because of the constant flow of hydraulic fluid. Independently of this temperature adjustment function, the line pressure can be regulated by the pressure maintained in the cylinder volume. In this manner, a roll is produced having zonal bending control and a temperature distribution that is not significantly affected when there is a change in the line pressure distribution.

Another important advantage of the sealing element of the invention, or of the roll that is equipped with such sealing elements, is that the force exerted by the sealing element against the inner circumference of the hollow cylinder is not transmitted through the sealing element, as is the case with the piston-like supporting elements of DE-AS 2230139 or the EP 0252251. In these disclosures, the force generated by the supporting element, which is directed against the inner circumference of the hollow cylinder, is produced in the cylinder chamber below the piston-like supporting element and, under its effect, the supporting element is pushed against the inner circumference of the hollow cylinder. This occurs because, in the case of DE-AS 2230139, the hydraulic fluid in the cylinder chamber is only relieved through choke bores and in the case of the EP 0252251, the cylinder chamber is not relieved at all. The transmission of force in this manner through the supporting element requires that the area of supporting element upon which the fluid acts be appropriately designed to produce the required supporting force. The practical consequence of this is that if the hydrostatic pressure chamber at the contact side of the supporting element breaks down, this supporting element is pressed against the inner circumference of the hollow cylinder with a force whose magnitude corresponds to the designed supporting force, but without the presence of fluid bearing arrangement in the area of the failed hydrostatic pressure chamber. As a result, metallic friction immediately develops, which can lead to a rapid breakdown of the supporting element, or even of the hollow cylinder.

On the other hand, the supporting element of the invention is a genuine sealing element. It is hydraulically relieved of the pressure produced by the supporting force by the first ducts, which have a large cross sectional area, located between the cylinder chamber and the pressure chamber. The contact pressure Of the sealing element on the inner circumference of the hollow cylinder does not generate the supporting force, but rather is only operable to seal the pressure chamber. If, in this connection, one of the second throttling ducts leading to the individual rim chambers becomes blocked, then only its associated rim chamber breaks down. Since the sealing element of the invention contacts the inner circumference of the hollow cylinder with a considerably lower pressure than heretofore possible, the danger of a destructive metallic friction occurring between the sealing element and the inner circumference of the hollow cylinder is reduced in comparison with the known sealing elements.

EP 0252251 discloses two separate supply lines for a supporting element in the same general manner as the invention. However, in this document the cylinder chamber, which has one supply line leading thereto, is closed, and the pressure chamber is supplied by the other supply line. In the invention, the pressure chamber is directly connected to the cylinder chamber without the use of any restrictive passages. As a result, the pressure in the cylinder chamber does not exert any force on the sealing element and the same hydraulic fluid is used in the cylinder chamber and the pressure chamber. The only function of the hydraulic fluid in the cylinder volume of the piston and cylinder unit is to produce the contact pressure for the sealing element, and along with the rim chambers, provide the stabilizing effect.

In the Case of a roll provided with an internal stroke, i.e., a roll in which a bearing arrangement permits radial shifting of the hollow cylinder in the active plane relative to the crosshead, a damping device for braking the radial movement of hollow cylinder is desirable. Without exception, rolls of the type in question are arranged horizontally. Therefore, when a hollow cylinder is no longer acted upon by supporting forces, it has a tendency to fall downwardly onto the top of the crosshead or until contact is made on an appropriate end stop (for example on the supporting elements or on rim bearings, which absorb the axial forces). Considering that hollow cylinders can weigh up to 20 tons and in view of the large amount of strain energy that may be stored in a bent crosshead, if no special preventive measures are taken when the supporting pressure is suddenly removed, the resulting collision can be powerful and cause damage.

For calendars, whose bottom roll is a hydraulically supported roll constructed according to the invention, an important feature of the damping device is provision of a dead travel segment, i.e., a portion of substantially unimpeded movement. With this type of roll arrangement, if the damping device became active right away, the damping could hinder the ability to open the roll nip quickly, as is desired in the case of a tear in the web or the like. At the start of the downward movement, therefore, the hollow cylinder should be able to fall unhindered. Thus, the damping device of the invention becomes active only after the initial dead travel segment has been traversed.

The damping device of the invention may be a separate component, but it is preferred that the damping device be integrated or part of the sealing element of the invention. In this manner, construction is simplified and there is no need to weaken the crosshead with bores or recesses provided therein to accommodate the damping device. A particularly advantageous damping device comprises a damping piston that plunges during the downward movement of the sealing element towards the crosshead into a damping cylinder having restricted discharge passages for throttling the hydraulic fluid that is displaced therefrom as the damping piston moves into the damping cylinder.

Another aspect of the invention concerns the discovery that the liquid film at the edge of the pressure chamber can have a distinct effect on a different type of damping, namely, the damping of vibrations occurring inside the roll during operation. For example, when the edge of the pressure chamber and the inner circumference of the hollow cylinder approach each other suddenly, the liquid film is displaced through the narrow gap at the edge of the pressure chamber. A damping action results from this throttle effect. However, this damping action occurs only if the sealing element cannot easily move downward when the inner circumference of the hollow cylinder suddenly approaches. If the sealing element were to move downwardly, the hydraulic fluid contained in the cylinder volume of the piston and cylinder unit would partly flow off through the restricted second ducts into the rim chambers. However, for the most part, the fluid in the cylinder volume would be forced back through the supply line to the pump.

To prevent this effect and to make the sealing element "harder" to move in the cylinder bore, a further feature of the invention includes provision of a check valve preventing fluid in the cylinder volume from being forced back to the pump. In this manner, the throttle effect of the liquid film on the edge of the pressure chamber can be used to its advantage to damp roll vibrations.

As a consequence of provision of this check valve, and without any additional measures, the hollow cylinder could only be lowered as quickly as permitted by the discharge of hydraulic fluid from the cylinder volume via the narrow, restricted second ducts into the individual rim chambers. Such an arrangement would, therefore, be an obstacle to quickly lower the hollow cylinder for rapid separation of the roll and counterroll.

To provide for a quick lowering of the cylinder, a further check valve can be provided. This further check valve is provided in an additional passage connected between the cylinder volume and clearance space and only permits flow from the cylinder volume. The check valve does not open until a predetermined pressure value is achieved in the cylinder volume, which value must lie above the pressure normally occurring in the cylinder volume during usual operation. If the hollow cylinder is required to be suddenly lowered, the pressure in the cylinder chamber and the pressure chamber drops and the entire weight of the hollow cylinder is supported solely by the hydraulic fluid in the cylinder volume. This increases the pressure therein until it exceeds the opening pressure of this further check valve, which then opens to allow the relatively small volume of hydraulic fluid to immediately flow from the cylinder volume to the clearance space. Thus, a rapid lowering of the cylinder is possible. Of course, the opening pressure of this check valve must be less than the pressure in the cylinder volume generated by the weight of the hollow cylinder. This further feature of the invention makes it possible to take advantage of the damping effect of the liquid film at the edge of the pressure chamber and, at the same time, to retain the capability to quickly lower the cylinder.

Further advantages, features and embodiments of the invention are apparent from consideration of the following detailed description, drawing and appended claims.

BRIEF DESCRIPTION OF THE DRAWINGS

FIG. 1 schematically depicts, partly in longitudinal section, a pair of rolls provided with sealing elements constructed according to the principles of the invention;

FIG. 2 shows, in a slightly enlarged scale, a transverse cross sectional view of the pair of rolls taken along the line II—II of FIG. 1;

FIG. 3 shows a view corresponding to FIG. 1 of another pair of rolls of the invention in which the sealing elements of the invention are provided in the bottom roll;

FIG. 4 shows a transverse cross sectional view taken along line IV—IV of FIG. 3 in a slightly enlarged scale;

FIG. 5 shows, in an enlarged scale, a sealing element constructed according to the principles of the invention in a cross sectional view taken along line V—V of FIG. 6;

FIG. 6 shows a top view of the sealing element of FIG. 5;

FIG. 7 shows a View corresponding to FIG. 5 of another embodiment of the sealing element of the invention in a cross sectional view taken along lines VII—VII of FIG. 8;

FIG. 8 shows a top view of the sealing element of FIG. 7;

FIGS. 9 and 10 illustrate cross sectional views of the sealing element of FIG. 7 taken along lines IX—IX and X—X of FIG. 8, respectively.

DETAILED DESCRIPTION

Figure 11:
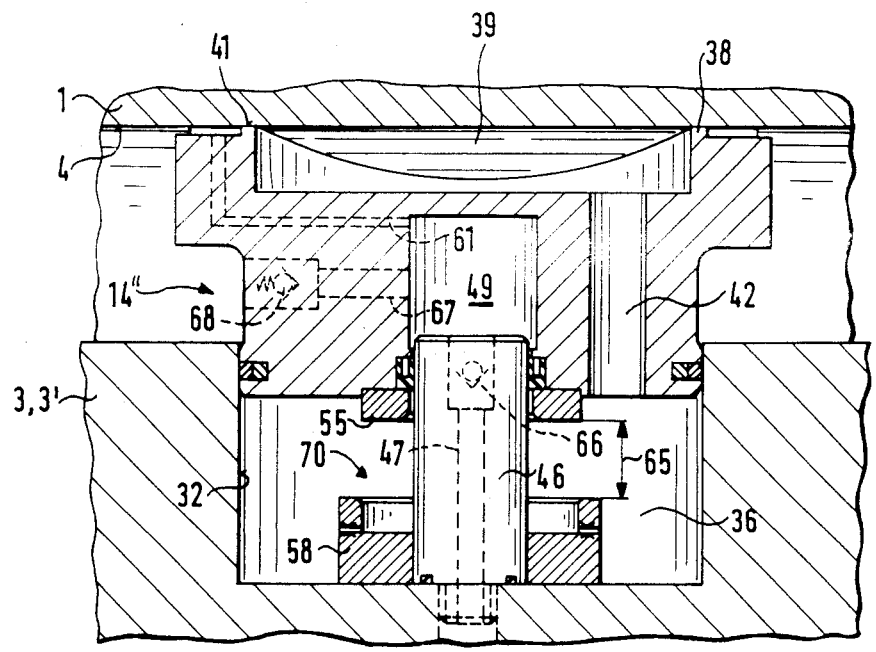
FIG. 11 shows a view corresponding to FIG. 5 of a further embodiment of the sealing element of the invention in cross section.

The roll arrangement depicted in FIGS. 1-2 comprises a bottom roll 10 and a top roll 100, which together form a roll nip 31 through which a textile web 30 of fabric or other material is conducted for pressure treatment of the web. The bottom roll 10 may be a conventional solid roll, while the top roll 100 comprises a rotating hollow cylinder 1, whose outer surface 2 forms the working roll circumference, and a stationary crosshead 3 extending lengthwise through the cylinder. The stationary crosshead 3 is spaced from the inner circumference 4 of the hollow cylinder 1, thereby forming an annular clearance space therewith, so that the crosshead can bend inside the hollow cylinder 1 without coming into contact with the inner circumference 4.

The journals 21 of the bottom roll 10, along with the ends 5 of the crosshead 3, which protrude from the ends of the hollow cylinder 1, are supported in a cylinder stand by suitable loading supporting devices (not shown) in a manner known in the art.

The ends of hollow cylinder 1 may be rotatably supported on the crosshead 3 by means of bearings (not shown in FIGS. 1-2) in a manner known in the art. Alternatively, and in a manner also known in the art, the hollow cylinder 1 may be supported on the crosshead 3 for movement in the active plane of the roll, i.e., in the plane connecting the axes of both rolls 10 and 100 that lies parallel to the plane of the drawing in FIG. 1. Thus with this type of support arrangement cylinder 1 can move radially, as a whole, in this plane relative to the crosshead 3.

The clearance space 6 between the crosshead 3 and the inner circumference 4 of the hollow cylinder 1 is sealed at its ends by transverse end seals (not shown) and may be filled with hydraulic fluid via a supply line 7. The fluid can then flow from space 6 to the supply tank 9 via a line 8. A relief valve 11, mounted in line 8, ensures that a predetermined pressure is maintained in the clearance space 6. The supply line 7 discharges fluid from pump 12 into the clearance space 6 at the left end of the roll in FIG. 1, while the return line 8 conducts fluid from space 6 at the right end of the roll to tank 9. In this manner, a flow results in the longitudinal direction of the clearance space that may be used to control the temperature of the hollow cylinder 1, if the hydraulic fluid is used to influence temperature. The hydraulic fluid returned to the supply tank is pressurized by pump 12, which, as mentioned above, is connected to the supply line 7.

The pressure in the hollow cylindrical clearance space 6 would be uniform throughout, if it had no partitions whatsoever. Thus, if no additional measures were taken, the pressure in space 6 would not exert any net force on the hollow cylinder 1 that would lead to a displacement of the cylinder or cause it to exert a force in the active plane. In this state, the hollow cylinder 1 is simply "inflated" by the pressure in the space 6, without showing any other outwardly visible effects.

This uniform pressure distribution is disrupted by zones 13 formed in the hollow cylinder 1 on the side remote from the roll nip 31. The pressure prevailing in the space 6 is not conducted to these zones, whose linear extent is indicated by small brackets. The embodiment of FIGS. 1-2 has six of these zones, but this number may be varied.

The zones 13 are formed by annular sealing elements 14, which are movably guided in cylinder bores 15 disposed on the top side of the crosshead 3. The front surface of the sealing elements is appropriately designed to conform with the inner circumference 4 of the hollow cylinder 1 to seal thereagainst when the front surface abuts the inner circumference 4. Each of the cylinder bores 15 is connected via a branch line with one of several supply lines 16 (FIG. 2) and, by way of these supply lines, with a controlling system 17, which may contain regulatory valves and the like. The supply lines 16, schematically depicted, are actually double lines, each of which comprises two separate supply lines 16', 16" through which the sealing element 14 may be supplied with two hydraulic fluids, which are independent of each other and are supplied by the control system 17, as described subsequently in greater detail. In this manner, the pressure in zones 13 can be maintained by the pressure in the pressure chambers, which are formed in the annular sealing elements 14 and are open to the inner circumference 4 of the hollow cylinder 1.

In a first mode of operation, the pressure in zones 13 is lower than the pressure in the space 6 and can be independently controlled in the individual sealing elements 14, or in groups of sealing elements 14, in accordance with the number of supply lines 16 provided. In the simplest case, the control device 17 may connect zones 13 directly with the supply tank 9 such that the zones 13 are virtually pressureless. In this manner, "holes" or "empty spaces", in which the pressure in space 6 does not prevail in zones 13, exist in the otherwise uniformly pressurized clearance space 6. This causes the force exerted by the fluid contained in the space 6 to become uneven. Imaginary zones 18 formed on the diametrically opposite side of cylinder 1 oppose zones 13, relative to the meridian plane of the roll 100, i.e., the longitudinal central plane of the roll 100 or of the crosshead 3 that is perpendicular to the plane of the drawing in FIG. 1. Within these imaginary zones 18, again indicated by small brackets in FIG. 1, the full pressure prevails in the clearance space 6. Since no pressure or only a reduced pressure in the zones 13 opposes the pressure in zones 18, the total effect of the existence of the zones 13 is, for the most part, the same as if a pressure was exerted locally on the bottom side of the crosshead 3. In other words, the effect is the same as if pressure was exerted in zones 18, which corresponds to the pressure in the space 6 and strives to shift the hollow cylinder 1 downward according to FIG. 1, relative to the crosshead 3, i.e., toward the roll nip 31. Therefore, although in roll 100 of FIG. 1, the sealing elements 14 are arranged on the top side of the crosshead 3, the net force is exerted downward. This is achieved by the basic principle of using a clearance space 6 that has no longitudinal seals and is completely filled, i.e., filled with hydraulic fluid under a uniform pressure, except for a predetermined number of zones, which are at a reduced pressure.

In FIG. 1, two additional pressure pistons 19 arranged on the bottom side of the crosshead 3 are also depicted. These pistons can exert a positive force against the bottom side of the inner circumference 4 of the hollow cylinder 1. A pump 20 supplies pistons 19 with hydraulic fluid. Of course, the pressure that supplies the pressure pistons 19 may be drawn from pump 12 instead. Since the pressure pistons 19 are only accessory elements, which enable the line pressure distribution produced by the zones 13 to be optionally modified, they are represented, along with their supply lines and pump 20, with dash-dot lines.

In a second mode of operation, a pressure greater than the pressure in the space 6 can be supplied to the sealing elements 14 by suitable regulatory valves, pumps, etc., in the controlling system 17. In this mode, the hollow cylinder 1 of the roll 100 experiences a force, which according to FIGS. 1-2 is directed upwardly and tends to pull the cylinder away from the roll nip 31. Therefore, this mode of operation can be used to open the roll nip 31, for example, to introduce a new web 30.

In the roll arrangement of FIGS. 3-4 the roll of the invention is the bottom roll 200. The reference numerals in FIGS. 3-4 are the same for the corresponding parts described in FIGS. 1-2. The bottom roll 200 of FIGS. 3-4 comprises, in the same manner as the top roll 100 of FIGS. 1-2, a hollow cylinder 1, which rotates bout a crosshead 3'. This hollow cylinder 1 works against a top roll 10 and exerts a pressure on a fabric Web 30 in the roll nip.

However, contrary to the roll of FIGS. 1-2 in this embodiment, longitudinal seals 24 are provided at opposite sides of the crosshead 3 at its widest point relative to active plane W. Seals 24 extend from one transverse end seal of the roll 200 to the other to divide the clearance space between the crosshead 3' and the inner circumference 4 of the hollow cylinder 1 into two semi-cylindrical shaped spaces 6' and 6". The space 6', situated on the side of the roll nip, can be filled with hydraulic fluid by the pump 12 via the line 7. This hydraulic fluid is returned via a line 8' and a relief valve 11 to the supply tank 9. The hydraulic fluid in the space 6', whose pressure can be predetermined by the relief valve 11, exerts a generally uniform force against the roll nip 31 and, thus, directly contributes to the generation of the line pressure in the nip. Any fluid or seepage flowing past the longitudinal gaskets 24 is conducted to the space 6", which is almost pressureless or at only a slight pressure.

The uniform pressure exerted in the space 6' is disrupted by the sealing elements 14, which in this embodiment are arranged on the side of crosshead adjacent the roll nip. The sealing elements 14 make it is possible to adjust the pressure in the zones 23 via the supply lines 26 to either a valve that is reduced relative to the space 6', or a value that is increased relative to the space 6'. This is accomplished by means of the controlling system 27 via which the pressure chambers in the sealing elements 14 can be selectively connected with the supply tank 9 via the line 25, so that virtually no pressure or only a predetermined reduced pressure prevails inside of the sealing elements, or with the pump 22, so that a pressure that is increased relative to the pressure in the space 6' can be supplied to the pressure chambers of sealing elements 14. In this manner, the sealing elements 14 exert a positive pressure, which is greater than the pressure of the hydraulic fluid in the space 6', against the inner circumference of the hollow cylinder 1 at zones 23. Although FIGS. 3-4 schematically depict supply lines 26, these lines 26 may also be designed as double lines comprised of separate supply lines 26',26" through which separate hydraulic fluids can be supplied to the sealing elements 24.

Therefore, in the embodiment of FIGS. 3-4 as well the sealing elements 14 have two modes of operation. However, contrary to the embodiment of FIGS. 1-2 in which the hollow cylinder 1 is pressed against the roll nip 31 in one mode, while being pulled away from the nip in the other mode, in this embodiment in the pressure within the zones 23 is modified locally by the sealing elements 14 such that the line pressure distribution is influenced, but in any event, a line pressure does exist because of seals 24 and pressureless space 6". If the pressure in the sealing elements 14 is lower than the pressure in the space 6', "holes" are formed in the uniform pressure distribution. However, if the pressure in elements 14 is greater, then a positive supplementary pressure, which surpasses the pressure in the space 6', is exerted in the zones 23. In the former case, the sealing elements act as "underpressure elements", while in the second case they function as "overpressure elements".

In FIGS. 5-6, a sealing element constructed according to the invention is depicted in greater detail. This sealing element can be used in the previously described roll embodiments and similar roll arrangements. As is apparent from FIG. 5, the sealing element 14 comprises a cylindrical, piston-like housing 40, which is seated with clearance in a cylinder bore 32 formed in the crosshead 3,3'. On its lower end according to FIG. 5, housing 40 has an edge 33, which projects outwardly to the dimension figure $D_1$ of the cylinder bore 32, which is sealed by a circular piston ring-type seal 34. The sealing element 14 is movable in the axial direction of the cylinder bore 32. A cylinder chamber 36 is formed between the bottom or back side of the sealing element 14 and the bottom surface 35 of the cylinder bore 32. Cylinder chamber 36 can be filled with hydraulic fluid through supply line 16',26'. At its top end, the cylindrical housing 40 has a circular projection 37 in which a flat pressure chamber 39, defined by a closed circular rim 38, is recessed into the sealing element 14. Chamber 39 has an open end that faces the inner circumference 4 of the hollow cylinder 1. In the embodiment shown, flat pressure chamber 39 has a circular boundary and, in practice, may have a diameter of between 80 to 320 mm and a depth of several millimeters. At the same time, the top of the circular rim 38 forms a contact surface 41 for abutting the inner circumference 4 of the hollow cylinder 1.

The cross section of the sealing element 14 is not completely closed or solid, but rather is cut through from the bottom side to the pressure chamber 39 by traversing ducts 42, which have a large cross section. The lower, middle part of the housing 40 of the sealing element 14 has a hollow cylindrical construction formed by a concentric, cylindrical midsection 43, which, in the embodiment shown, is supported by four radial segments 44 leading to the radially outer section of the housing 40. The ducts 42, as clearly shown in FIG. 6, are formed between the segments 44. Because of the large cross sectional area of the ducts 42, the pressure of the fluid in the supply lines 16',26' is also present in the pressure chamber 39 and acts against the inner circumference 4 of the hollow cylinder 1. This pressure can be greater or less than the pressure in the surrounding clearance space 6, 6'.

A cylinder bore 45, which has a closed top, is formed in the cylindrical midsection 43. A fixed piston 46, which is screwed tightly to the bottom surface 35 of the cylinder chamber 36 and which has a central passageway 47 connected to the supply line 16",26", is received in cylinder bore 45. A sealing arrangement 48 provided in the lower area of the midsection 43 seals the piston 46 in the cylinder bore 45. Above the piston 46, a cylinder volume 49 is formed, which is connected via radial ducts 51, extending through the segments 44 to rim chambers 50, formed in the contact surface 41 of the rim 38 of the housing. These rim chambers 50 are enclosed all on sides by the rim 38, but are open toward the inner circumference 4 of the hollow cylinder 1, as well as in the area of the segments 44. In the embodiment shown, rim chambers 50 span a circumferential angle 52 of approximately 35° of housing 40.

It is significant that the duct 51 is provided with a throttling construction, i.e., either its diameter is small over its entire length, or, as depicted at the left-side of FIG. 5, it contains a restrictor 53. Depending upon the degree of throttling, a load-bearing liquid film is formed at the border of the rim chambers 50, which form a section of the contact surface 41. This load-bearing film braces the sealing element 14 against the pressure exerted in the cylinder volume 49, which is directed against the inner circumference 4 of the hollow cylinder 1 for supporting same. The four rim chambers 50 in the embodiment shown are separate from each other and are evenly distributed over the circumference of element 14. They are separately throttled and supplied with hydraulic fluid such that a load bearing liquid film of a predetermined thickness exists at locations distributed over the circumference. In this way, the entire sealing element 14 is stably supported on the liquid film and also is held, at spaced circumferential areas, between the rim chambers 50 (which, therefore, do not need to extend over the entire circumference) at a predetermined, very small clearance distance from the inner circumference 4 of the hollow cylinder 1. Thus, no metallic contact can occur anywhere between the rim 38 and the inner circumference 4 of the hollow cylinder 1. For this type of complete stabilization, at least three rim chambers 50, which are independent from each other, are required. It is also possible to provide more rim chambers than the four rim chambers 50 shown in this embodiment.

In the embodiment of FIGS. 5–6, the diameter $D_2$ of the pressure chamber 39, which is circular in shape, is the same as the diameter $D_1$ of the cylinder chamber 36. With this design, the sealing element 14 is unaffected by the forces exerted in the pressure chamber 39 against the inner circumference 4 of the hollow cylinder 1. Also, the contact pressure required for the sealing action is determined solely by the pressure in the cylinder volume 49.

However, it is also possible to make the diameter $D_2$ of the pressure chamber 39 slightly larger than the diameter $D_1$, e.g., by some percentage, such as 5%. With this design, a certain excess force, which tends to press the sealing element 14 away from the inner circumference 4 of the hollow cylinder 1, develops as a result of the pressure in the pressure chamber 39. This excess force is counteracted by the pressure in the cylinder volume 49. Then, when a temperature-controlled hydraulic fluid is introduced through the supply lines 16', 26' under a constant volumetric flow, the pressure in the pressure chamber 39 adjusts itself to a value, which is determined by the force due to the pressure in the cylinder volume 49. Due to the uniform volumetric flow of the temperature-controlled hydraulic fluid, a mostly uniform heat transfer occurs between the hollow cylinder 1 and the hydraulic fluid. The pressure i.e., the line pressure generated, can be adjusted and controlled by regulating the pressure in the cylinder volume 49 accordingly, without affecting the uniform heat transfer and, consequently, affecting the adjusted temperature of the hollow cylinder 1.

Another sealing element embodiment 14' is depicted in FIGS. 7–10. The reference numerals used in these figures are the same for parts that correspond with those previously discussed. The sealing element 14' differs from the sealing element 14 of FIGS. 5–6 mainly in that the rim chambers are not constructed in the rim 38 of the pressure chamber 39 itself, but rather are disposed radially outward from the rim at the corners of a square housing 40' in the top section, which faces the inner circumference 4 of the hollow cylinder 1. The rim chambers 60 are connected, as apparent in FIG. 10, via throttling ducts 61 with the common cylinder chamber 49. The cross sectional area of the rim chambers 60 are in the shape of an isosceles triangle. The shape of the top contact surface 62 of the rim chambers 60 conforms to the inner circumference 4 of the hollow cylinder 1 for abutting same, as is likewise apparent in FIG. 10. Crescent-shaped segments 63, which are disposed radially outward from the rim 38 of the pressure chamber 39 and have top surfaces lying in the same cylindrical surface as the rim 38 (Which also conforms to the inner circumference 4 of the hollow cylinder 1), function as scrapers for the hydraulic fluid carried along the inner circumference 4 of the rotating hollow cylinder 1. In conjunction with both of the rectangular sections 64 (FIG. 8) disposed outside of the rim 38 in the longitudinal direction of the roll, the crescent-shaped segments 63 have the additional purpose of providing a contact surface for the sealing element 14', which has, for the most part, the same extent in the circumferential direction of the cylinder at every location along its longitudinal axis. This is significant to ensure that the heat generated as a result of the hydrodynamic friction in the contact area consequently also remains somewhat constant over the length of the sealing element 14'. This type of construction is described in more detail in the assignee's copending U.S. application Ser. No. 07/348,696 entitled Internal Support Element For A Hydrostatically Supported Roll, the disclosure of which is incorporated by reference herein. The ducts 42, which have a large cross sectional area, are constructed in this embodiment as parallel axis bores evenly distributed over the circumference.

If in the use of the sealing element 14', the pressure in the supply lines 16',26' or 16",26" is removed, the sealing element 14' would drop very quickly under the weight of the hollow cylinder 1 and possibly hit the top side of the crosshead 3,3' with great force. To prevent this effect, a damping device 70 is provided which comprises a ring 55 screwed onto the bottom side 54 of the housing 40'. This ring surrounds the piston 46' has an outer cylindrical circumference 56 and, at the same time, retains the sealing arrangement 48 in place. A cylinder 58, which is open at its top end and has inner peripheral area 57 with a slightly larger diameter than the outer diameter of peripheral area 56, is screwed onto the bottom surface 35 of the cylinder chamber 36. The cylinder 58 surrounds the piston 46 in the same manner as the ring 55. When the sealing element 14' moves downwardly, the ring 55 plunges like a piston into the cylinder 58. Since the trapped hydraulic fluid can only flow from the cylinder through the clearance between surfaces 56 and 57 or through additionally provided choke bores 59, a damping effect occurs. The opening of the cylinder 58 at its top end ensures that the hydraulic fluid will be trapped therein, even if the cylinder chamber 36 is partially emptied. The amount of time that passes between the time when the pressure is removed from the cylinder chamber 36 until the ring 55 plunges into the cylinder 58 is so short that no significant quantity of fluid can run out of any choke bores 59, if provided. To facilitate the lifting of the sealing element 14', nonreturn valves 69 can be arranged in the choke bores 59, as depicted in the left-hand choke bore 59 illustrated in FIG. 7.

It is important that the damping device provide an initial dead travel segment 65 (FIG. 7). This means that the sealing element 14' can initially fall freely by the amount 65 in the top side of the crosshead 3,3', until the damping device 70 begins its braking action. The braking action begins only when the ring 55 has reached the top side of the cylinder 58. In this manner, it is possible to quickly separate a roll used, for example, as a bottom roll in a calendar by the amount 65 and the end position s still reached without any harmful impact.

In FIG. 11, another sealing element embodiment 14" is depicted which, for the most part, corresponds to the sealing element 14' of FIGS. 7-10. However, this sealing element differs in that a nonreturn valve 66, which is open to flow into the cylinder volume 49, is arranged in the end of the longitudinal bore 47 of the piston 46 adjacent the cylinder volume 49. Valve 66 prevents hydraulic fluid from flowing in reverse through the longitudinal bore 47 towards the pump. Furthermore, an additional duct 67 is provided, which leads from the cylinder chamber 49 to the clearance space between the hollow cylinder 1 and the crosshead 3,3'. A nonreturn valve 68, which is open only to flow in a direction toward the clearance space, is biased closed until a predetermined opening pressure of, for example, 40 bar, is prevalent in duct 67.

The nonreturn valve 66 causes the sealing element 14' to become "harder", when there is a falling movement of the hollow cylinder 1, because the hydraulic fluid from the cylinder volume 49 can actually escape only through the throttle lines 61 into the rim chambers (not shown in FIG. 11). The second nonreturn valve 68 is provided so that the initial dead travel segment 65 remains effective, in spite of the nonreturn valve 66, and thereby the roll can be quickly lowered to open the nip. When the total weight of the hollow cylinder 1 is supported by the cylinder volume 49 and the pressure inside the cylinder volume 49 rises accordingly so that the opening pressure of the nonreturn valve 68 is exceeded, valve 68 allows the cylinder volume 49 to be quickly evacuated and the hollow cylinder 1 to fall quickly. The nonreturn valve 66 is connected in the flow path from cylinder volume 49, because, in this way, the best possible "hardening" effect is provided and, hence, the throttle action of the liquid film on the contact surface 41 of the rim 38 of the pressure chamber 39 is advantageously employed to damp roll vibrations.

What is claimed is:

1. A sealing element for a roll having controllable line pressure in which the roll includes a rotatable hollow cylinder forming a working roll circumference at its outer diameter, a stationary crosshead extending lengthwise through the hollow cylinder to form a surrounding clearance space with an inner circumference of the hollow cylinder, and piston-like sealing elements, distributed over a length of the hollow cylinder, radially movable in cylinder bores provided in the crosshead, said sealing element comprising:

a contact surface having a shape conforming to the inner circumference of the hollow cylinder for sealingly abutting the inner circumference;

an enclosed rim formed in said contact surface defining a hydrostatic pressure chamber therein, said pressure chamber having an open end facing the inner circumference of the hollow cylinder;

at least two rim chambers separate, and spaced, from said hydrostatic pressure chamber, said rim chambers each having an open end facing the inner circumference of the hollow cylinder;

at least one unrestricted first duct, extending through the sealing element, connecting said pressure chamber to a cylinder chamber disposed below the sealing element for supplying hydraulic fluid from the cylinder chamber to the pressure chamber without a drop in pressure; and at least two restricted second ducts, each of which is separate from said first duct and connected at one of its ends to a cylinder volume in the sealing element and at its other end to one of the rim chambers for throttling hydraulic fluid.

2. The sealing element of claim 1 wherein said at least two rim chambers comprise three rim chambers equidistantly distributed about a circumference of said enclosed rim, said at least two restricted second ducts comprising three restrictive second ducts, with each rim chamber being supplied separately with hydraulic fluid via a respective second duct communicating with a cylinder volume of a piston and cylinder unit associated with the sealing element for moving the sealing element in its cylinder bore.

3. The sealing element of claim 1 wherein said rim chambers are formed as recesses in said enclosed rim.

4. The sealing element of claim 1 wherein said rim chambers are formed as recesses separate from said enclosed rim.

5. The sealing element of claim 4 wherein said rim chambers are disposed radially outward from said enclosed rim.

6. The sealing element of claim 1 wherein said hydrostatic pressure chamber has an effective cross sectional area and said cylinder chamber has an effective cross sectional area approximately equal to the effective cross sectional area of the hydrostatic pressure chamber.

7. The sealing element of claim 1 wherein the effective cross sectional area of said hydrostatic pressure chamber is up to 5% (percent) greater than the effective cross sectional area of the cylinder chamber.

8. The sealing element of claim 1 further comprising a damping device for damping downward movement of the sealing element in the cylinder bore.

9. The sealing element of claim 9 wherein said damping device includes means for permitting an initial dead travel segment of substantially unimpeded movement.

10. The sealing element of claim 9 wherein the damping device is part of the sealing element.

11. The sealing element of claim 10 wherein said damping device comprises a damping cylinder and damping piston, which plunges during downward movement of the sealing element into the damping cylinder, said damping cylinder having restricted discharge passages for throttling hydraulic fluid that is displaced from the damping cylinder as the damping piston moves therein.

12. A roll having controllable line pressure comprising:
 a rotatable hollow cylinder forming a working roll circumference at its outer diameter;
 a stationary crosshead extending lengthwise through the hollow cylinder to form a surrounding clearance space with an inner circumference of the hollow cylinder;
 piston-like sealing elements, distributed over the length of a hollow cylinder, radially movable in cylinder bores provided in the crosshead to form cylinder chambers deposed between a bottom end of the sealing elements and a bottom surface of the cylinder bores;
 a piston and cylinder unit associated with each sealing element for moving the sealing element in its respective cylinder bore, said piston and cylinder unit being disposed parallel to a longitudinal axis of its respective cylinder bore and having a cylinder volume of smaller cross sectional area than that of its respective cylinder chamber, with one of said piston and cylinder volume being provided on the bottom surface of the respective cylinder bore and the other of said piston and cylinder volume being formed in the respective sealing element;
 at least two separate hydraulic fluid supply lines provided in the crosshead, with a first one of said supply lines being connected to the cylinder chambers and a second one of said supply lines being connected to the cylinder volumes; and
 each of said sealing elements include:
  (i) a contact surface having a shape conforming to the inner circumference of the hollow cylinder for sealingly abutting the inner circumferences;
  (ii) an enclosed rim formed in said contact surface defining a hydrostatic pressure chamber therein, said pressure chamber having an open end facing the inner circumference of the hollow cylinder;
  (iii) at least two rim chambers separate, and spaced, from said hydrostatic pressure chamber, said rim chambers each having an open end facing the inner circumference of the hollow cylinder;
  (iv) at least one unrestricted first duct, extending through the sealing element, connecting its respective pressure chamber and cylinder chamber for supplying hydraulic fluid from the cylinder chamber to the pressure chamber without a drop in pressure; and
  (v) at least two restricted second ducts, each of which is separate from said first duct and connected at one of its ends to said cylinder volume and at its other end to one of the rim chambers for throttling hydraulic fluid supplied to the rim chambers.

13. The roll of claim 12 wherein said at least two rim chambers comprise three rim chambers equidistantly distributed about the circumference of said enclosed rim, said at least two restricted second ducts comprising three restrictive second ducts, with each rim chamber being supplied separately with hydraulic fluid via a respective second duct.

14. The roll of claim 12 wherein said rim chambers are formed as recesses in said enclosed rim.

15. The roll of claim 12 wherein said rim chambers are formed as recesses separate from said enclosed rim.

16. The roll of claim 15 wherein said rim chambers are disposed radially outward from said enclosed rim.

17. The roll of claim 12 wherein the each hydrostatic pressure chamber has an effective cross sectional area and each cylinder has an effective cross sectional area approximately equal to the effective cross sectional area of its respective hydrostatic pressure chamber.

18. The roll of claim 12 wherein the effective cross sectional area of each hydrostatic pressure chamber is up to 5% (percent) greater than the effective cross sectional area of its respective cylinder chamber.

19. The roll of claim 12 further comprising:
 a bearing arrangement for rotatably supporting the hollow cylinder and guiding the hollow cylinder for radial movement in an active plane of the roll; and
 a damping device for damping the movement of the hollow cylinder by damping downward movement of at least one of said sealing elements in its respective cylinder bore.

20. The roll of claim 19 wherein said damping device includes means for permitting an initial dead travel segment of substantially unimpeded movement.

21. The roll of claim 20 wherein said damping device comprises a damping cylinder and damping piston, which plunges during the downward movement of the sealing element towards the crosshead into the damping cylinder, upon loss of hydraulic pressure in said cylinder chamber and pressure chamber, said damping cylinder having restricted passages for throttling hydraulic fluid displaced from the damping cylinder as the damping piston moves therein.

22. The roll of claim 21 wherein said sealing elements are mounted in a top side of said crosshead and each sealing element includes a damping device.

23. The roll of claim 2 wherein said second supply line includes branch lines communicating with a pump and each cylinder volume, each branch line includes a check valve preventing flow from its respective cylinder volume.

24. The roll of claim 23 further comprising a further passage provided in each sealing element connecting the respective cylinder volume to the clearance space between the hollow cylinder and the crosshead, each further passage including a check valve permitting flow from the cylinder volume to the clearance space upon the pressure in the cylinder volume attaining a predetermined value.

25. The roll of claim 19 wherein said second supply line includes branch lines communicating with a pump and each cylinder volume, the branch line associated with said at least one sealing element includes a check valve preventing flow from its cylinder volume.

26. The roll of claim 25 further comprising a further passage provided in said at least one sealing element connecting its cylinder volume to the clearance space between the hollow cylinder and the crosshead, said passage including a check valve permitting flow from the cylinder volume to the clearance space upon the pressure in the cylinder volume attaining a predetermined value.

* * * * *